US012050002B2

(12) United States Patent
Zou et al.

(10) Patent No.: US 12,050,002 B2
(45) Date of Patent: *Jul. 30, 2024

(54) LIGHTING APPARATUS

(71) Applicant: XIAMEN ECO LIGHTING CO. LTD., Xiamen (CN)

(72) Inventors: Renhua Zou, Xiamen (CN); Youqin Lin, Xiamen (CN); Xianwu Lin, Xiamen (CN); Fanglei Zhao, Xiamen (CN); Zhixian Wu, Xiamen (CN)

(73) Assignee: XIAMEN ECO LIGHTING CO. LTD., Xiamen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/081,953

(22) Filed: Dec. 15, 2022

(65) Prior Publication Data

US 2023/0119276 A1 Apr. 20, 2023

Related U.S. Application Data

(63) Continuation of application No. 17/466,446, filed on Sep. 3, 2021, now Pat. No. 11,555,603.

(30) Foreign Application Priority Data

Sep. 15, 2020 (CN) ........................ 202022019132.2

(51) Int. Cl.

*F21V 23/04* (2006.01)
*F21K 9/235* (2016.01)

(Continued)

(52) U.S. Cl.

CPC .......... *F21V 23/0435* (2013.01); *F21K 9/235* (2016.08); *F21V 23/003* (2013.01); *F21V 29/70* (2015.01); *F21Y 2115/10* (2016.08)

(58) Field of Classification Search

CPC .... F21V 23/0435; F21V 29/70; F21V 23/003; F21V 23/04; F21V 23/00; F21V 23/005;

(Continued)

(56) References Cited

U.S. PATENT DOCUMENTS 11,555,603 B2* 1/2023 Zou .................... F21V 23/0435
2014/0300293 A1* 10/2014 Ruan ......................... F21S 2/00 315/294

(Continued)

*Primary Examiner* — Bao Q Truong

(74) *Attorney, Agent, or Firm* — Chun-Ming Shih; LANWAY IPR SERVICES

(57) ABSTRACT

A lighting apparatus includes multiple LED modules, a driver and a wireless circuit. The driver for converting an external power to a driving current. The light source plate includes a first metal layer, an insulation layer and a second metal layer. The second metal layer has a larger thickness than the first metal layer. The first metal layer has a first portion and a second portion. The first portion is used for electrically connecting the multiple LED modules. The second portion forms an antenna radiation part. The insulation layer is between the first metal layer and the second metal layer. The wireless circuit electrically connected to the second portion of the first metal layer. The antenna radiation part is used as an antenna for receiving a wireless signal.

20 Claims, 7 Drawing Sheets

(51) Int. Cl.

| | |
|---|---|
| ***F21V 23/00*** | (2015.01) |
| ***F21V 29/70*** | (2015.01) |
| *F21Y 115/10* | (2016.01) |

(58) Field of Classification Search

CPC ...... F21K 9/235; F21K 9/238; F21Y 2115/10; H05B 47/19; H05B 45/00; H05B 45/30; H01Q 13/10

See application file for complete search history.

(56) References Cited

U.S. PATENT DOCUMENTS

| | | | | |
|---|---|---|---|---|
| 2015/0103515 | A1* | 4/2015 | Bosua | F21K 9/232 362/373 |
| 2016/0072176 | A1* | 3/2016 | Van Dijk | F21V 29/70 343/721 |
| 2020/0318823 | A1* | 10/2020 | Bocock | F21V 29/83 |

* cited by examiner

Flg. 1

LIGHTING APPARATUS

RELATED APPLICATION

The present application is a continued application U.S. patent application Ser. No. 17/466,446.

FIELD

The present invention is related to a lighting apparatus, and more particularly related to a lighting apparatus with a wireless control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Light devices are used for provide illumination. However, more and more needs are required in today market.

People expect light devices to be integrated with other devices. For example, people would like to control light devices with their mobile phones or home stations.

Therefore, it is important to design light devices with nice wireless support while not affecting original light effect and manufacturing cost.

SUMMARY

In some embodiments, a lighting apparatus includes multiple LED modules, a driver and a wireless circuit.

The driver for converting an external power to a driving current.

The light source plate includes a first metal layer, an insulation layer and a second metal layer.

The second metal layer has a larger thickness than the first metal layer.

The first metal layer has a first portion and a second portion.

The first portion is used for electrically connecting the multiple LED modules.

The second portion forms an antenna radiation part.

The insulation layer is between the first metal layer and the second metal layer.

The wireless circuit electrically connected to the second portion of the first metal layer.

The second metal layer, the insulation layer and the antenna radiation part together form an antenna for receiving a wireless signal.

The antenna radiation part is used as an antenna for receiving a wireless signal.

The wireless circuit is coupled to the driver for controlling the multiple LED modules according to the wireless signal.

In some embodiments, the second metal layer is an aluminum layer with a second thickness larger than ten times a first thickness of the first metal layer.

In some embodiments, the lighting apparatus may also include a separate heat sink unit.

A peripheral edge of the second metal layer engages the separate heat sink unit for moving heat of the multiple LED modules to the separate heat sink unit.

In some embodiments, the first portion of the first metal layer includes a conductive path for connected the multiple LED modules to an first electrode.

The driver is electrically coupled to the first electrode for transmitting the driving current to the multiple LED modules.

In some embodiments, the driver includes a driver plate and a driver component.

The driver component is mounted on the driver plate.

The driver plate and the multiple LED modules are placed on opposite sides of the light source plate.

In some embodiments, the wireless circuit is placed on a separate wireless circuit board instead of the driver plate.

In some embodiments, the second portion of the first metal layer is located upon the separate wireless circuit board.

In some embodiments, the second portion of the first metal layer, the insulation layer and the second metal layer together form an antenna module.

In some embodiments, the first portion and the second portion of the first metal layer are different.

In some embodiments, the second portion of the first metal layer has a different shape corresponding to a different wireless signal frequency.

In some embodiments, a length of the second portion of the first metal layer is equal to a whole number fraction of a fundamental frequency of the wireless signal.

In some embodiments, the first metal layer further including a third portion.

The third portion is used as another antenna radiation part.

In some embodiments, the second portion and the third portion correspond to different wireless protocols.

In some embodiments, the second portion and the third portion receive the wireless signal at the same time for the wireless circuit to enhance a recovered signal quality of the wireless signal.

In some embodiments, a separator area is placed between the first portion and the second portion of the first metal layer.

In some embodiments, the separation area is made of electrical insulation material.

In some embodiments, the second portion of the first metal layer and the wireless circuit are made as a separate module to be coupled to the first metal portion and the second metal layer.

In some embodiments, the first portion of the first metal layer forms a reception concave opening for attaching the second portion of the first metal layer.

In some embodiments, a lens has an inner wall engaging the light source plate.

The multiple LED modules are placed inside the inner wall and the second portion of the first metal layer is placed outside the inner wall of the lens.

In some embodiments, the lighting apparatus may also include a bulb shell and an Edison cap.

The bulb shell encloses the light source plate.

The driver is placed inside the Edison cap.

DETAILED DESCRIPTION

Figure 3:
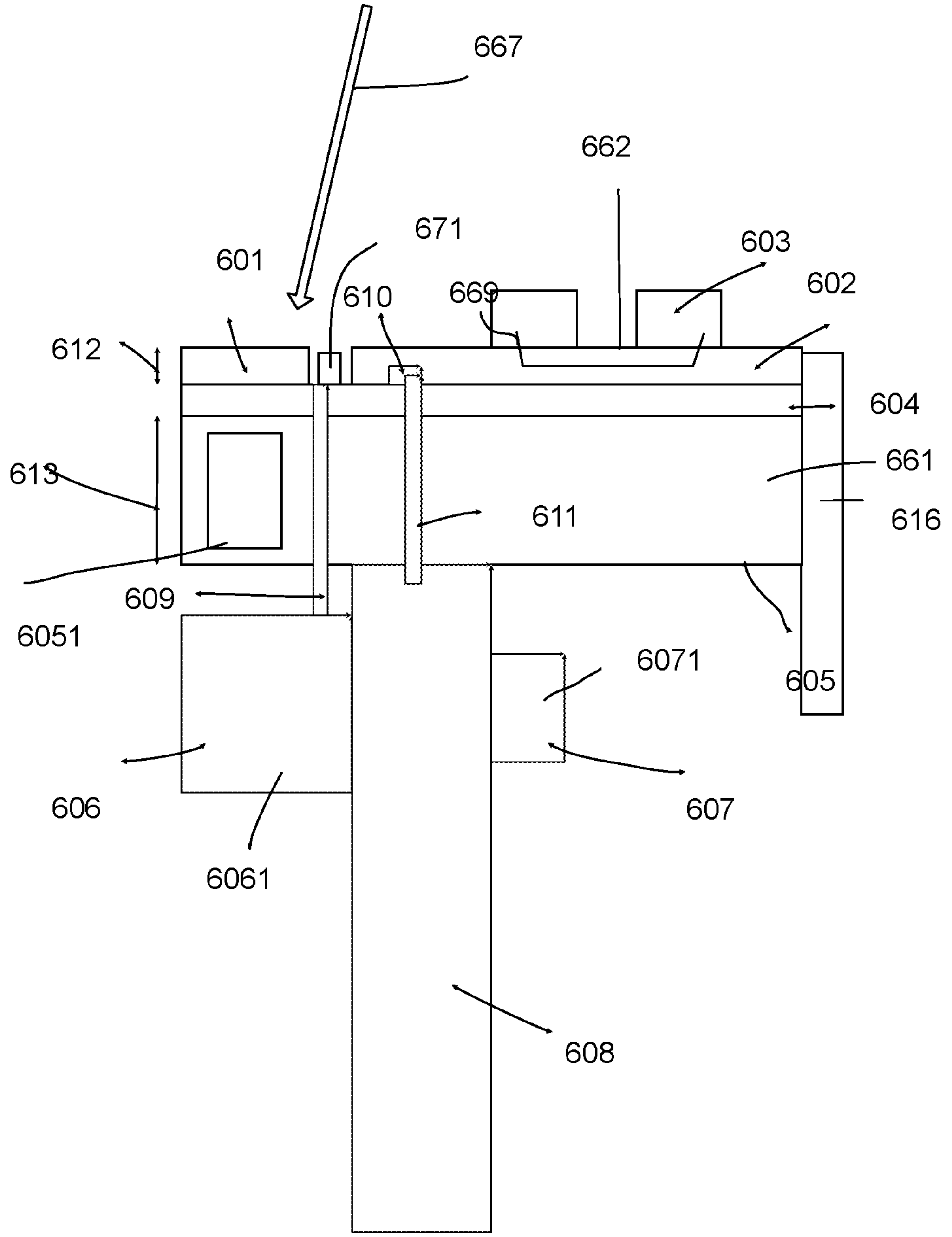
FIG. 3 illustrates another lighting apparatus embodiment.

In FIG. 3, a lighting apparatus includes multiple LED modules 603, a driver plate 661, driver 607 and a wireless circuit 606. The driver 607 may include driver components 6071 like a rectifier, a transformer, a capacitor, or other components for converting an alternating current to a driving current for driving the LED modules 603 to emit lights.

The driver component 6071 is mounted on a driver plate 607. The driver plate 607 may be a circuit board with conductive path 611 for transmitting the driving current to the LED module 603.

The driver 607 is used for converting an external power to a driving current.

The light source plate 661 includes a first metal layer 662, an insulation layer 604 and a second metal layer 605.

The second metal layer 605 has a larger second thickness 613 than the first thickness 612 of the first metal layer 662.

The first metal layer 662 has a first portion 602 and a second portion 601.

The first portion 602 is used for electrically connecting the multiple LED modules 603.

The second portion 601 forms an antenna radiation part.

The insulation layer 604 is between the first metal layer 662 and the second metal layer 605.

The wireless circuit 606 is electrically connected to the second portion 601 of the first metal layer 662.

The second metal layer 605, the second portion 601 and the insulation layer 604 together form an antenna for receiving a wireless signal 667. In some embodiments, the second metal layer 605 is electrically insulated from the wireless circuit 606.

The wireless circuit 606 is coupled to the driver 607 for controlling the multiple LED modules 603 according to the wireless signal 667.

In some embodiments, the second metal layer 605 is an aluminum layer with a second thickness 613 larger than ten times a first thickness 612 of the first metal layer 662.

In some embodiments, the lighting apparatus may also include a separate heat sink unit 616. The separate heat sink unit 616 is a separate unit from the light source plate 662. The shape of the separate heat sink unit 616 may be a circular ring or a circular cup made of metal material for heat dissipation.

A peripheral edge of the second metal layer 605 engages the separate heat sink unit 616 for moving heat of the multiple LED modules 603 to the separate heat sink unit 612.

In some embodiments, the first portion 602 of the first metal layer 662 includes a conductive path 669 for connected the multiple LED modules 603 to an first electrode 610.

The driver 667 is electrically coupled to the first electrode 610 for transmitting the driving current to the multiple LED modules 603.

In some embodiments, the driver 607 includes a driver plate 608 and a driver component 6071.

The driver component 6071 is mounted on the driver plate 608.

The driver plate 608 and the multiple LED modules 603 are placed on opposite sides of the light source plate 662.

In some embodiments, the wireless circuit 606 is placed on a separate wireless circuit board 6061 instead of the driver plate 608.

In some embodiments, the second portion 601 of the first metal layer 662 is located upon the separate wireless circuit board 6061. In some embodiments, a portion 6051 of the second metal layer 605 below the second portion 601 is kept hollow for providing a better signal quality.

In some embodiments, the second portion 601 of the first metal layer 662, the insulation layer 604 and the second metal layer 605 together form an antenna module.

In some embodiments, the first portion 602 and the second portion 601 of the first metal layer 661 are different, e.g. made of different metal material. For example, the second portion 601 is made of a metal material like a silver alloy material better for receiving wireless signal while the first portion 602 is made of copper alloy.

In some embodiments, the second portion 601 of the first metal layer 662 has a different shape corresponding to a different wireless signal frequency. For example, an antenna radiation part with a circular shape, an arc shape, a rectangular shape, a wave shape corresponding to different wireless protocols like Wi-Fi, Zig-Bee.

In some embodiments, a length of the second portion of the first metal layer is equal to a whole number fraction, e.g. ½, ⅓, ¼ of a fundamental frequency wave length of the wireless signal.

Figure 4:
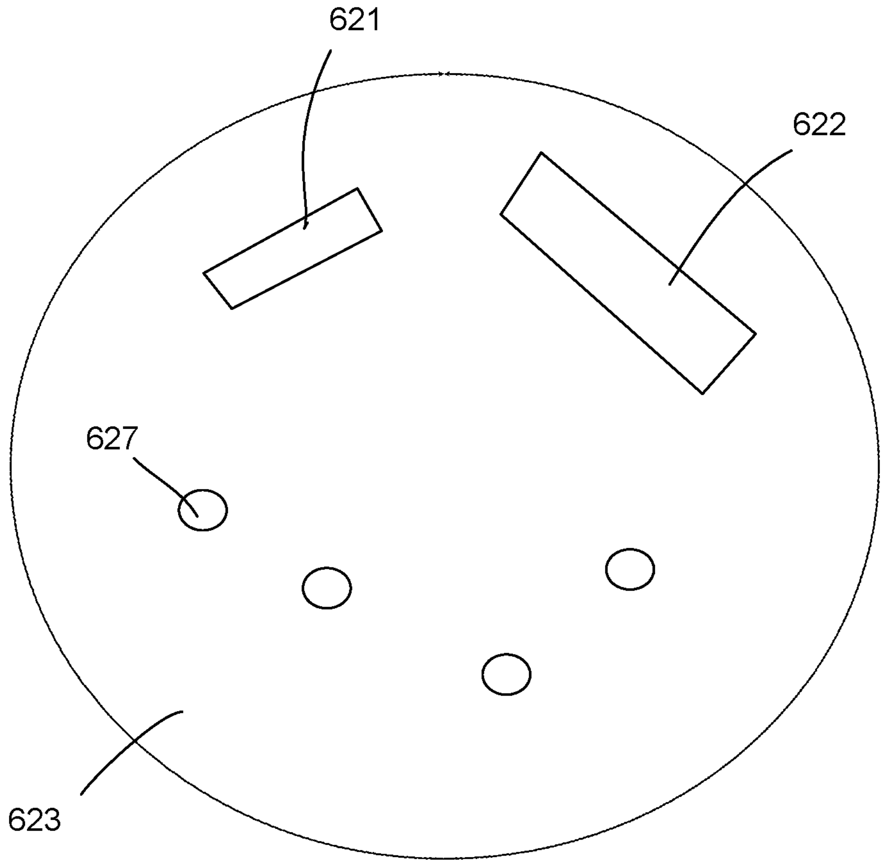
FIG. 4 shows another example with two antenna radiation parts.
Figure 5:
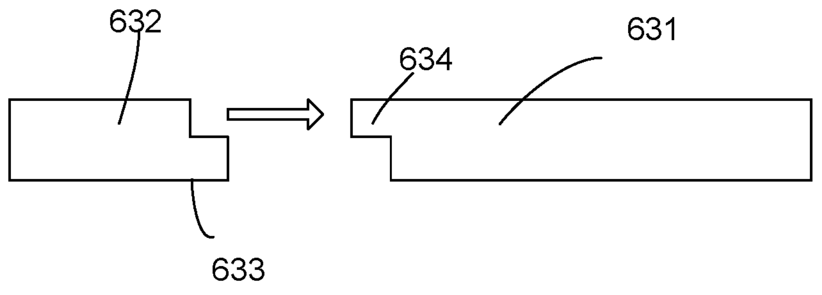
FIG. 5 shows a detachable design of the second portion and the first portion of the first metal layer.

In FIG. 4, the first metal layer further including a third portion 622 in addition to a second portion 621. The third portion 622 and the second portion 621 are separate from a first portion 623 of the first metal layer. The first portion 623 is used for mounted with LED modules while the second portion 621 and the third portion 622 are used for two antenna radiation parts.

The third portion is used as another antenna radiation part.

In some embodiments, the second portion and the third portion correspond to different wireless protocols.

In some embodiments, the second portion and the third portion receive the wireless signal at the same time for the wireless circuit to enhance a recovered signal quality of the wireless signal. The wireless circuit analyze two signal sources from the second portion and the third portion to combine and/or to execute signal processing to enhance signal quality.

In FIG. 3, a separator area 671 is placed between the first portion 602 and the second portion 601 of the first metal layer 662.

In some embodiments, the separation area 671 is made of electrical insulation material.

In some embodiments, the second portion of the first metal layer and the wireless circuit are respectively made as a separate module 632 to be coupled to the first metal portion and the second metal layer 631. In other words, the wireless circuit is integrated with the second portion mentioned above as a separate module to be integrated, buckled, or inserted to the first portion.

In some embodiments, the first portion of the first metal layer forms a reception concave opening for attaching the second portion of the first metal layer. For example, the first metal layer as a whole is a circular shape. The second portion occupies an area and the first portion occupies the rest while providing a reception concave opening to insert the second portion.

Figure 6:
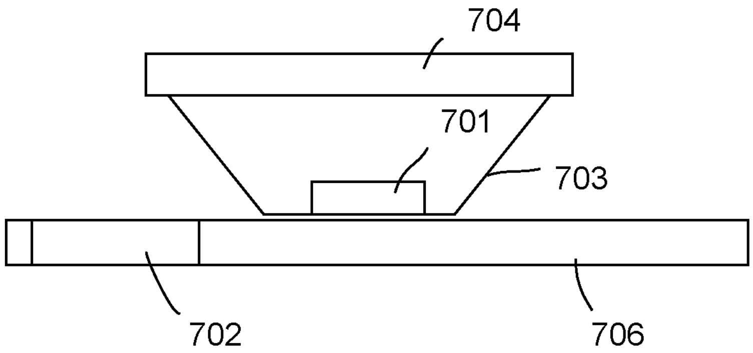
FIG. 6 shows another example with a lens.

In FIG. 6, a lens 704 has an inner wall 703 engaging the light source plate 706.

The multiple LED modules 701 are placed inside the inner wall 703 and the second portion 702 of the first metal layer is placed outside the inner wall 703 of the lens 704.

Figure 7:
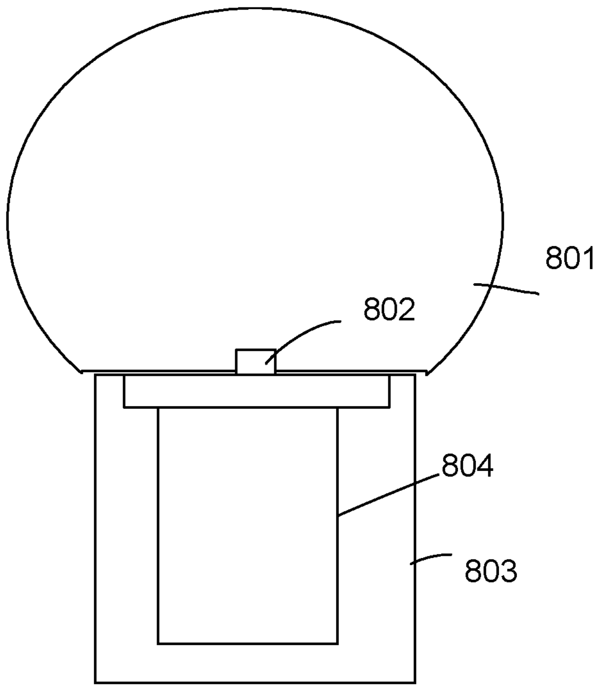
FIG. 7 shows a light bulb example.

In FIG. 7, the lighting apparatus may also include a bulb shell 801 and an Edison cap 803.

The bulb shell 801 encloses the light source plate 802.

The driver 804 is placed inside the Edison cap 803.

Figure 2:
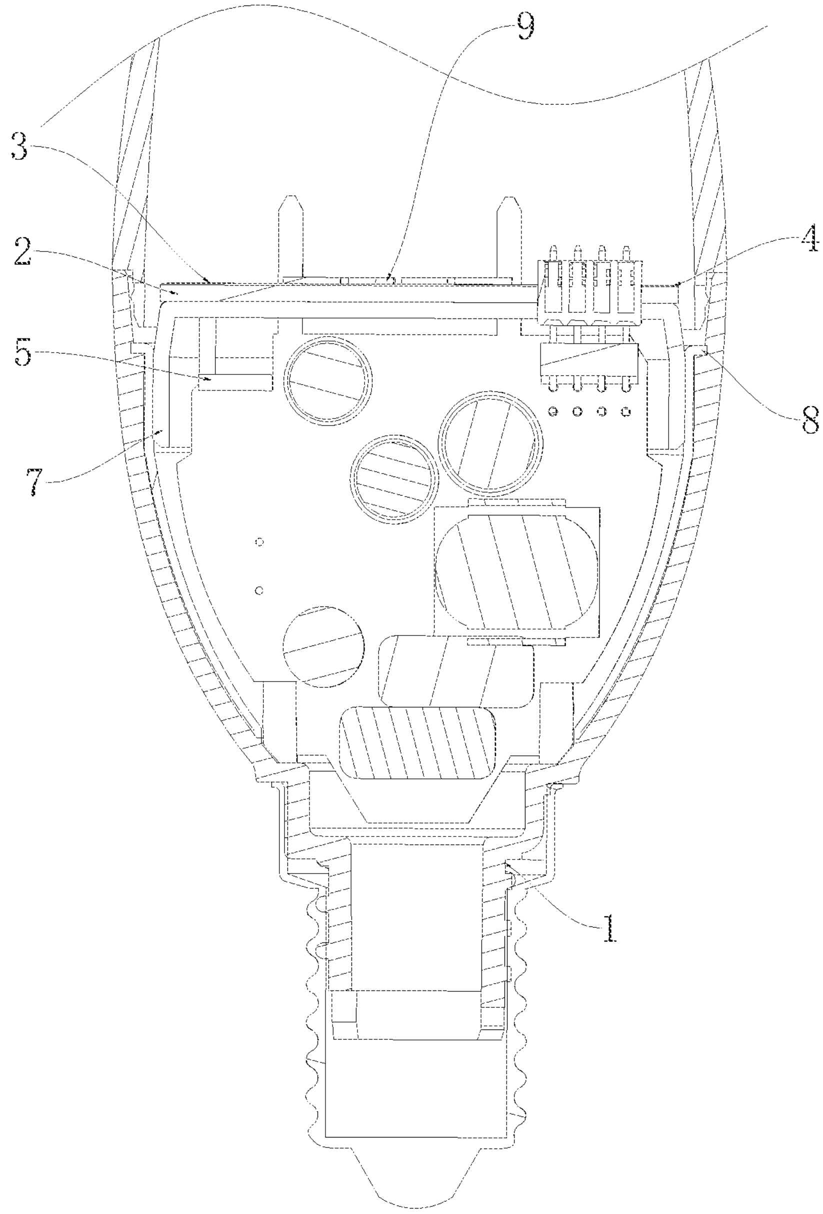
FIG. 2 illustrates a cross-sectional view of an example.

Please refer to FIG. 2, which shows another embodiment.

In FIG. 2, a light source 9 is mounted on a substrate 2. The substrate 2 is made of a thick aluminum plate, serving as the second metal layer as mentioned above.

There is an insulation layer 4 above the substrate 2. A first metal layer 3 has a first portion and a second portion. A wireless circuit 5 is used for receiving a wireless signal from the second portion of the metal layer 3. There is a buckle bracket 8 for installing a heat sink unit 7. There is a light housing 1 with an Edison cap.

Figure 1:
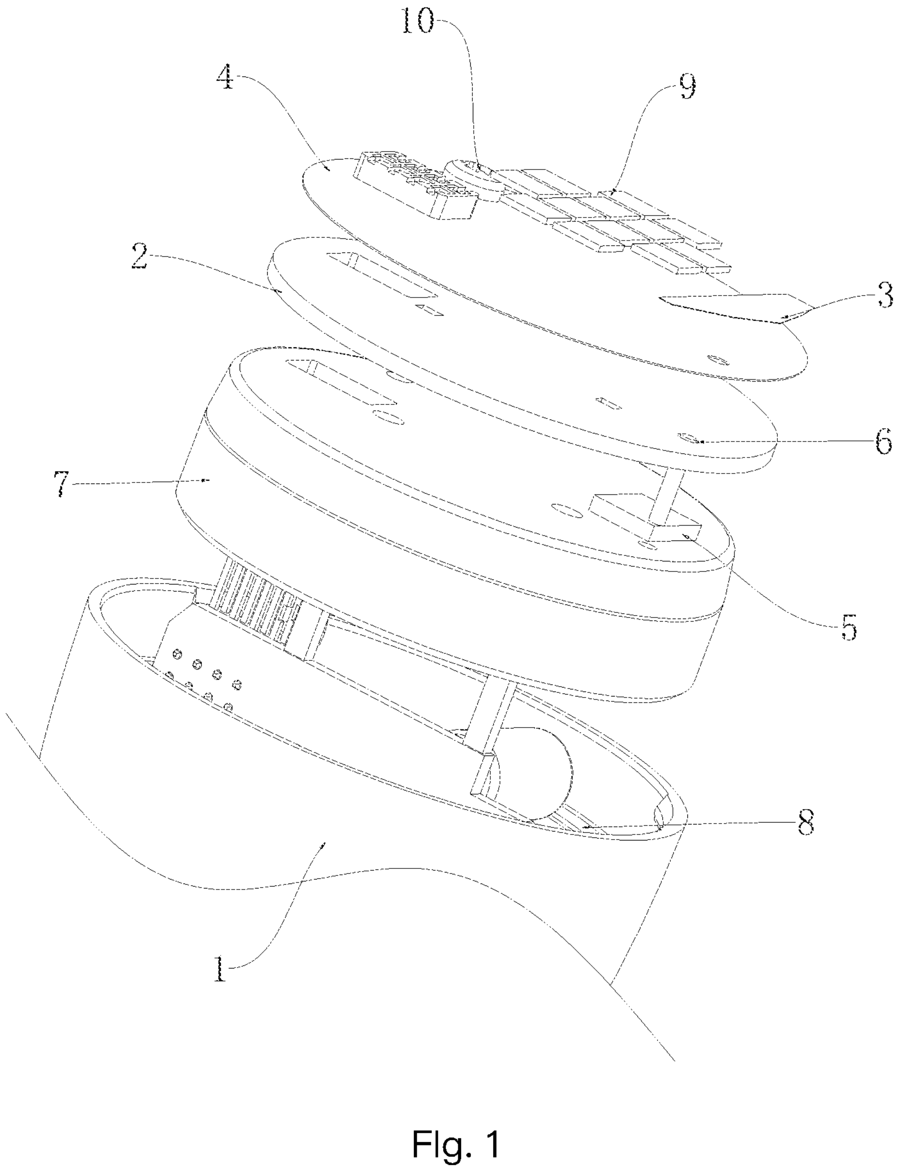
FIG. 1 illustrates an exploded view of a lighting apparatus embodiment.

Please refer to FIG. 1, which shows an exploded view of the example in FIG. 2. The same reference numerals refer to the same components. The wireless circuit 5 has a conductive pin passing through a hole 6 to couple to the second portion which serves as a wireless radiation part. There is a fastener 10 like a screw for combining components together.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a LED module;

a driver for converting an external power to a driving current;

a light source module, comprising a first metal layer, an insulation layer and a second metal layer, wherein the second metal layer has a larger thickness than the first metal layer, wherein the first metal layer has a first portion and a second portion, wherein the first portion is used for electrically connecting the LED module, wherein the second portion forms an antenna radiation part, wherein the insulation layer is between the first metal layer and the second metal layer; and a wireless circuit electrically connected the second portion of the first metal layer, wherein the second metal layer, the insulation layer and the antenna radiation part together form an antenna for receiving a wireless signal, wherein the wireless circuit is coupled to the driver for controlling the LED module according to the wireless signal.

2. The lighting apparatus of claim 1, wherein the second metal layer is an aluminum layer with a second thickness larger than ten times a first thickness of the first metal layer.

3. The lighting apparatus of claim 2, further comprising a separate heat sink unit, wherein a peripheral edge of the second metal layer engages the separate heat sink unit for moving heat of the LED module to the separate heat sink unit.

4. The lighting apparatus of claim 2, wherein the first portion of the first metal layer comprises a conductive path for connected the LED module to an first electrode, wherein the driver is electrically coupled to the first electrode for transmitting the driving current to the LED module.

5. The lighting apparatus of claim 2, wherein the driver comprises a driver plate and a driver component, wherein the driver component is mounted on the driver plate, wherein the driver plate and the LED module is placed on opposite sides of the light source module.

6. The lighting apparatus of claim 5, wherein the wireless circuit is placed on a separate wireless circuit board instead of the driver plate.

7. The lighting apparatus of claim 6, wherein the second portion of the first metal layer is located upon the separate wireless circuit board.

8. The lighting apparatus of claim 1, wherein the second portion of the first metal layer, the insulation layer and the second metal layer together form an antenna module.

9. The lighting apparatus of claim 8, wherein the first portion and the second portion of the first metal layer are different.

10. The lighting apparatus of claim 8, wherein the second portion of the first metal layer has a different shape corresponding to a different wireless signal frequency.

11. The lighting apparatus of claim 8, wherein a length of the second portion of the first metal layer is equal to a whole number fraction of a fundamental frequency wave length of the wireless signal.

12. The lighting apparatus of claim 1, wherein the first metal layer further comprising a third portion, wherein the third portion is used as another antenna radiation part.

13. The lighting apparatus of claim 12, wherein the second portion and the third portion correspond to different wireless protocols.

14. The lighting apparatus of claim 12, wherein the second portion and the third portion receive the wireless signal at the same time for the wireless circuit to enhance a recovered signal quality of the wireless signal.

15. The lighting apparatus of claim 1, wherein a separator area is placed between the first portion and the second portion of the first metal layer.

16. The lighting apparatus of claim 15, wherein the separation area is made of electrical insulation material.

17. The lighting apparatus of claim 1, wherein the second portion of the first metal layer and the wireless circuit is made as a separate module to be coupled to the first metal portion and the second metal layer.

18. The lighting apparatus of claim 17, wherein the first portion of the first metal layer forms a reception concave opening for attaching the second portion of the first metal layer.

19. The lighting apparatus of claim 1, wherein a lens has an inner wall engaging the light source module, wherein the LED module is placed inside the inner wall and the second portion of the first metal layer is placed outside the inner wall of the lens.

20. The lighting apparatus of claim 1, further comprising a bulb shell and an Edison cap, wherein the bulb shell encloses the light source module, wherein the driver is placed inside the Edison cap.

* * * * *